(12) United States Patent
Fedorov et al.

(10) Patent No.: US 9,403,143 B2
(45) Date of Patent: Aug. 2, 2016

(54) HYDROGEN-GENERATING REACTORS AND METHODS

(75) Inventors: Andrei G. Fedorov, Atlanta, GA (US); David L. Damm, Alpharetta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 565 days.

(21) Appl. No.: 13/158,648

(22) Filed: Jun. 13, 2011

(65) Prior Publication Data

US 2011/0236303 A1 Sep. 29, 2011

Related U.S. Application Data

(63) Continuation of application No. 11/708,772, filed on Feb. 21, 2007, now Pat. No. 7,981,171.

(60) Provisional application No. 60/792,014, filed on Apr. 16, 2006, provisional application No. 60/816,107, filed on Jun. 23, 2006.

(51) Int. Cl.
  *C01B 3/36* (2006.01)
  *B01J 19/18* (2006.01)
  *B01D 61/00* (2006.01)
  (Continued)

(52) U.S. Cl.
  CPC ............ *B01J 19/1893* (2013.01); *B01D 61/00* (2013.01); *B01J 12/007* (2013.01); *C01B 3/323* (2013.01); *C01B 3/501* (2013.01); *B01J 2219/00162* (2013.01); *B01J 2219/00166* (2013.01); *C01B 2203/0233* (2013.01); *C01B 2203/041* (2013.01); *C01B 2203/0475* (2013.01); *C01B 2203/1223* (2013.01); *C01B 2203/86* (2013.01); *Y02P 30/30* (2015.11)

(58) Field of Classification Search
  CPC ............ B01J 2219/00162; B01J 2219/00182; B01J 2219/00166
  USPC .................. 422/211–223, 232, 233, 236–239
  See application file for complete search history.

(56) References Cited

U.S. PATENT DOCUMENTS

| 3,554,707 A * | 1/1971 | Holmes ...................... B01J 7/02 |
| | | 422/105 |
| 6,099,621 A | 8/2000 | Ho |

(Continued)

*Primary Examiner* — Basia Ridley
*Assistant Examiner* — Imran Akram
(74) *Attorney, Agent, or Firm* — Thomas | Horstemeyer, LLP

(57) ABSTRACT

Reactors and methods that generate hydrogen from fuel, such as naturally-occurring or synthesized hydrocarbon fuel. One embodiment of the reactor comprises a $CO_2/H_2$ active membrane piston disposed inside a cylinder that provides for highly efficient and scalable hydrogen generation from hydrocarbon fuels. This embodiment may function in a two or four stroke modes. Another embodiment of the reactor comprises a dual piston configuration having $CO_2$ and $H_2$ active membrane pistons inside a single cylinder. Other embodiments of the reactor comprise flexible membranes or diaphragms that operate in a manner similar to pistons with or without regeneration of residual reaction products. Exemplary methods introduce fuel into a controllable volume, selectively control pressure, temperature and residence time of the fuel within the controllable volume, chemically react the fuel within the controllable volume with one or more catalysts to produce one or more chemical species, selectively remove via a membrane one or more of the chemical species from the controllable volume, and exhaust residual products from the controllable volume.

7 Claims, 12 Drawing Sheets

(51) Int. Cl.
*B01J 12/00* (2006.01)
*C01B 3/32* (2006.01)
*C01B 3/50* (2006.01)

(56) References Cited

U.S. PATENT DOCUMENTS

| | | | |
|---|---|---|---|
| 2001/0045364 A1* | 11/2001 | Hockaday et al. | 205/338 |
| 2002/0081235 A1* | 6/2002 | Baldwin et al. | 422/105 |
| 2004/0048115 A1* | 3/2004 | Devos | 429/19 |
| 2004/0131541 A1* | 7/2004 | Andersen | B01J 7/02 423/657 |
| 2005/0023236 A1 | 2/2005 | Adams et al. | |
| 2005/0074643 A1 | 4/2005 | Adams et al. | |
| 2005/0158595 A1 | 7/2005 | Marsh et al. | |
| 2005/0188614 A1* | 9/2005 | Mirkovic | G05B 19/0421 48/61 |
| 2006/0090397 A1* | 5/2006 | Edlund | B01J 19/249 48/61 |
| 2006/0133971 A1* | 6/2006 | Sun | B01J 8/0453 422/198 |
| 2006/0201148 A1* | 9/2006 | Zabtcioglu | F01K 17/02 60/508 |
| 2009/0324452 A1* | 12/2009 | Salinas et al. | 422/162 |

\* cited by examiner

Reset before intake

Fig. 20

| Reactants [mol] | | Pressure |
|---|---|---|
| $CH_3OH$ | $H_2O$ | [atm] |
| 1.0 | 1.0 | 1.0 |

| Temp [C] | Products [mol] | | | | | Meth Conversion [%] | Products [mol fraction] | | | | |
|---|---|---|---|---|---|---|---|---|---|---|---|
| | $CH_3OH$ | $H_2O$ | $H_2$ | CO | $CO_2$ | | $CH_3OH$ | $H_2O$ | $H_2$ | CO | $CO_2$ |
| 200 | 1.27E-03 | 0.10459 | 2.89287 | 0.10333 | 0.89541 | 99.873 | 3.18E-04 | 0.02616 | 0.72368 | 0.02585 | 0.22399 |
| 225 | 4.56E-04 | 0.13178 | 2.86731 | 0.13133 | 0.86822 | 99.954 | 1.14E-04 | 0.03295 | 0.71699 | 0.03284 | 0.21710 |
| 250 | 1.77E-04 | 0.16187 | 2.83778 | 0.16169 | 0.83813 | 99.982 | 4.43E-05 | 0.04047 | 0.70951 | 0.04043 | 0.20955 |
| 275 | 7.38E-05 | 0.19415 | 2.80571 | 0.19407 | 0.80585 | 99.993 | 1.84E-05 | 0.04854 | 0.70145 | 0.04852 | 0.20147 |
| 300 | 3.26E-05 | 0.22798 | 2.77195 | 0.22795 | 0.77202 | 99.997 | 8.16E-06 | 0.05700 | 0.69300 | 0.05699 | 0.19301 |

With hydrogen removal

| Temp [C] | Products [mol] | | | | | Meth Conversion [%] | Products [mol fraction] | | | | |
|---|---|---|---|---|---|---|---|---|---|---|---|
| | $CH_3OH$ | $H_2O$ | $H_2$ | CO | $CO_2$ | | $CH_3OH$ | $H_2O$ | $H_2$ | CO | $CO_2$ |
| 200 | 4.96E-06 | 0.02145 | 0.11272 | 0.02145 | 0.97855 | 99.99950 | 4.37E-06 | 0.01891 | 0.09939 | 0.01891 | 0.86279 |
| 225 | 1.91E-06 | 0.02789 | 0.11509 | 0.02789 | 0.97211 | 99.99981 | 1.67E-06 | 0.02440 | 0.10069 | 0.02440 | 0.85050 |
| 250 | 7.89E-07 | 0.03523 | 0.11690 | 0.03523 | 0.96477 | 99.99992 | 6.85E-07 | 0.03058 | 0.10146 | 0.03058 | 0.83738 |
| 275 | 3.57E-07 | 0.04368 | 0.11974 | 0.04368 | 0.95632 | 99.99996 | 3.07E-07 | 0.03754 | 0.10292 | 0.03754 | 0.82199 |
| 300 | 1.68E-07 | 0.05282 | 0.12131 | 0.05282 | 0.94718 | 99.99998 | 1.43E-07 | 0.04499 | 0.10332 | 0.04499 | 0.80671 |

Fig. 21

| Reactants [mol] | | Pressure |
|---|---|---|
| CH₃OH | H₂O | [atm] |
| 1.0 | 1.0 | 10.0 |

| | Products [mol] | | | | Meth Conversion | Products [mol fraction] | | | |
|---|---|---|---|---|---|---|---|---|---|
| Temp [C] | CH₃OH | H₂O | H₂ | CO | CO₂ | [%] | CH₃OH | H₂O | H₂ | CO | CO₂ |
| 200 | 0.07728 | 0.14418 | 2.70127 | 0.06690 | 0.85582 | 92.272 | 0.02010 | 0.03749 | 0.70246 | 0.01740 | 0.22255 |
| 225 | 0.03747 | 0.14832 | 2.77674 | 0.11085 | 0.85168 | 96.253 | 0.00955 | 0.03779 | 0.70744 | 0.02824 | 0.21699 |
| 250 | 0.01647 | 0.16847 | 2.79860 | 0.15200 | 0.83153 | 98.353 | 0.00415 | 0.04247 | 0.70546 | 0.03832 | 0.20961 |
| 275 | 0.00717 | 0.19682 | 2.78884 | 0.18965 | 0.80318 | 99.283 | 0.00180 | 0.04938 | 0.69972 | 0.04758 | 0.20152 |
| 300 | 0.00323 | 0.22911 | 2.76444 | 0.22588 | 0.77089 | 99.677 | 0.00081 | 0.05737 | 0.69223 | 0.05656 | 0.19303 |

With hydrogen separation

| | Products [mol] | | | | Meth Conversion | Products [mol fraction] | | | | |
|---|---|---|---|---|---|---|---|---|---|---|---|
| Temp [C] | CH₃OH | H₂O | H₂ | CO | CO₂ | [%] | CH₃OH | H₂O | H₂ | CO | CO₂ |
| 200 | 5.24E-04 | 0.02203 | 0.11612 | 0.02151 | 0.97797 | 99.948 | 4.60E-04 | 0.01935 | 0.10202 | 0.01890 | 0.85926 |
| 225 | 1.95E-04 | 0.02811 | 0.11630 | 0.02795 | 0.97189 | 99.981 | 1.70E-04 | 0.02446 | 0.10162 | 0.02442 | 0.84922 |
| 250 | 7.97E-05 | 0.03535 | 0.11743 | 0.03527 | 0.96465 | 99.992 | 6.91E-05 | 0.03067 | 0.10187 | 0.03060 | 0.83680 |
| 275 | 3.54E-05 | 0.04362 | 0.11930 | 0.04359 | 0.95638 | 99.996 | 3.05E-05 | 0.03771 | 0.10259 | 0.03748 | 0.82239 |
| 300 | 1.69E-05 | 0.05290 | 0.12162 | 0.05288 | 0.94710 | 99.998 | 1.44E-05 | 0.04504 | 0.10355 | 0.04502 | 0.80637 |

Fig. 22

| Reactants [mol] | | Pressure |
|---|---|---|
| CH₃OH | H₂O | [atm] |
| 1.0 | 1.0 | 5.0 |

| Temp [C] | Products [mol] | | | | Meth Conversion [%] | Products [mol fraction] | | | | |
|---|---|---|---|---|---|---|---|---|---|---|
| | CH₃OH | H₂O | H₂ | CO | CO₂ | | CH₃OH | H₂O | H₂ | CO | CO₂ |
| 200 | 2.70E-02 | 0.11849 | 2.82962 | 0.08954 | 0.88351 | 97.305 | 6.83E-03 | 0.02952 | 0.71707 | 0.02269 | 0.22389 |
| 225 | 1.08E-02 | 0.13616 | 2.84223 | 0.12536 | 0.86384 | 98.920 | 2.71E-03 | 0.03422 | 0.71442 | 0.03151 | 0.21713 |
| 250 | 4.35E-03 | 0.16352 | 2.82778 | 0.15918 | 0.83648 | 99.565 | 1.09E-03 | 0.04097 | 0.70848 | 0.03988 | 0.20958 |
| 275 | 1.83E-03 | 0.19480 | 2.80153 | 0.19297 | 0.80520 | 99.817 | 4.58E-04 | 0.04874 | 0.70103 | 0.04829 | 0.20148 |
| 300 | 8.14E-04 | 0.22826 | 2.77012 | 0.22744 | 0.77174 | 99.919 | 2.03E-04 | 0.05709 | 0.69281 | 0.05688 | 0.19301 |

With hydrogen separation

| Temp [C] | Products [mol] | | | | Meth Conversion [%] | Products [mol fraction] | | | | |
|---|---|---|---|---|---|---|---|---|---|---|
| | CH₃OH | H₂O | H₂ | CO | CO₂ | | CH₃OH | H₂O | H₂ | CO | CO₂ |
| 200 | 7.51E-04 | 0.03270 | 0.25883 | 0.03195 | 0.96730 | 99.925 | 5.81E-04 | 0.02531 | 0.20041 | 0.02474 | 0.74896 |
| 225 | 2.84E-04 | 0.04190 | 0.26184 | 0.04162 | 0.95810 | 99.972 | 2.17E-04 | 0.03214 | 0.20084 | 0.03192 | 0.73488 |
| 250 | 1.15E-04 | 0.05254 | 0.26421 | 0.05243 | 0.94746 | 99.989 | 8.73E-05 | 0.03990 | 0.20065 | 0.03982 | 0.71954 |
| 275 | 5.07E-05 | 0.06474 | 0.26872 | 0.06469 | 0.93526 | 99.995 | 3.80E-05 | 0.04885 | 0.20152 | 0.04851 | 0.70138 |
| 300 | 2.37E-05 | 0.07812 | 0.27255 | 0.07810 | 0.92188 | 99.998 | 1.75E-05 | 0.05784 | 0.20179 | 0.05782 | 0.68253 |

Fig. 23

Total pressure 1.0 atm

| Temp [C] | Reactants [mol] | | | |
|---|---|---|---|---|
| | CH$_3$OH | H$_2$O | H$_2$ | CO | CO$_2$ |
| 200 | 0.84450 | 0.86595 | 0.11272 | 0.02145 | 0.13405 |
| 225 | 0.82917 | 0.85706 | 0.11509 | 0.02789 | 0.14294 |
| 250 | 0.81240 | 0.84763 | 0.11690 | 0.03523 | 0.15237 |
| 275 | 0.79289 | 0.83657 | 0.11974 | 0.04368 | 0.16343 |
| 300 | 0.77236 | 0.82518 | 0.12131 | 0.05282 | 0.17482 |

Fig. 24

Total pressure 1.0 atm

| Temp [C] | Products [mol] | | | | | | | | | | Methanol Conversion [%] | | Hydrogen Recovery [mol] | |
|---|---|---|---|---|---|---|---|---|---|---|---|---|---|---|
| | CH$_3$OH | | H$_2$O | | CO | | H$_2$ | | CO$_2$ | | | | | |
| | A | B | A | B | A | B | A | B | A | B | A | B | A | B |
| 200 | 4.96E-06 | 5.15E-06 | 0.0215 | 0.0216 | 0.0215 | 0.0216 | 0.1127 | 0.1146 | 0.9786 | 0.9784 | 100.00 | 100.00 | 2.87 | 2.53 |
| 225 | 1.91E-06 | 1.95E-06 | 0.0279 | 0.0280 | 0.0279 | 0.0280 | 0.1151 | 0.1160 | 0.9721 | 0.9704 | 100.00 | 100.00 | 2.86 | 2.49 |
| 250 | 7.89E-07 | 7.86E-07 | 0.0352 | 0.0352 | 0.0352 | 0.0352 | 0.1169 | 0.1167 | 0.9648 | 0.9648 | 100.00 | 100.00 | 2.85 | 2.44 |
| 275 | 3.57E-07 | 3.50E-07 | 0.0437 | 0.0435 | 0.0437 | 0.0435 | 0.1197 | 0.1187 | 0.9563 | 0.9565 | 100.00 | 100.00 | 2.84 | 2.38 |
| 300 | 1.68E-07 | 1.67E-07 | 0.0528 | 0.0528 | 0.0528 | 0.0528 | 0.1213 | 0.1210 | 0.9472 | 0.9473 | 100.00 | 100.00 | 2.82 | 2.32 |

HYDROGEN-GENERATING REACTORS AND METHODS

CROSS-REFERENCE TO RELATED APPLICATIONS

This is a Continuation Application of copending U.S. Patent Application having Ser. No. 11/708,772, entitled: "Hydrogen-Generating Reactors And Methods," filed on Feb. 21, 2007, which claimed priority to Provisional Applications 60/792,014 filed Apr. 16, 2006 and 60/816,107 filed Jun. 23, 2006.

BACKGROUND

The present invention relates generally to reactors that generate hydrogen from hydrocarbon fuels.

Steam reforming of methanol to produce hydrogen for end use applications occurs via the following overall reaction requiring a catalyst:

$$CH_3OH + H_2O \rightleftharpoons 3H_2 + CO_2 \quad \Delta H = 49.4 \text{ kJ/mol} \quad (1)$$

This typically occurs in combination with at least two intermediate reactions:

1) endothermic (consuming heat) methanol decomposition $$CH_3OH \rightleftharpoons 2H_2 + CO \quad \Delta H = 92.0 \text{ kJ/mol} \quad (2)$$

2) reversible, exothermic (releasing heat) water gas shift (WGS) reaction $$CO + H_2O \rightleftharpoons H_2 + CO_2 \quad \Delta H = -41.1 \text{ kJ/mol} \quad (3)$$

A typical reactor has a first stage that requires heat input and operates at 250-300° C. over a catalyst that favors methanol decomposition [Eqs. (1) and (2)] in the forward direction. Thus, conversion of methanol is achieved by the following net reaction (neglecting trace byproducts), $$CH_3OH + H_2O \rightarrow (3-x)H_2 + (1-x)CO_2 + xCO + xH_2O$$

$$0 \leq x \leq 1 \quad \Delta H > 0 \quad (4)$$

Because the CO concentration is too high (1-4%) in the product mixture for the PEM fuel cells to tolerate (require CO<10 ppm), a second reactor stage is typically required, which is designed to operate at lower temperature (100-150° C.) over a catalyst that favors the conversion of CO into $CO_2$ via the water gas shift (WGS) reaction [Eq. (3)]. Also, excess water vapor is often added to further shift the equilibrium away from CO towards $CO_2$. However, because of the reversible nature of the WGS reaction, it is impossible to convert 100% of the CO or even to reduce its concentration to <10 ppm levels. Hence, an additional third stage is often required to either 1) preferentially oxidize the CO to acceptable levels or 2) purify the hydrogen by separation through a hydrogen selective membrane.

Technology for large scale steam reforming of methanol is quite mature and most reactors are of the fixed catalyst bed-type, operated in a steady-state, continuous-flow regime. While suitable for large-scale hydrogen generation, these reactors are fundamentally flawed for portable and distributed applications because of the poor process scale-up/down, sequential uni-functional design not suitable for miniaturization and system integration, and poor reaction yields due to fundamental mismatch between the time scales of the catalytic chemistry and the transport processes. For transportation and small scale distributed power applications, other important requirements include rapid startup, rapid transient response to changing power demands, high energy efficiency, purity of hydrogen (CO<10 ppm) produced, and lightweight, compact design. Further, in addition to removal of CO from the product, the potential for pre-concentration of the resulting greenhouse gas $CO_2$ for on-board sequestration is an appealing opportunity to reduce the environmental impact of the transportation sector. So far, it has proven difficult to meet these requirements through simple miniaturization of traditional reactor designs and processes. Thus, there is significant interest in development of small-scale, highly scalable reactors for producing hydrogen from synthetic (or natural) hydrocarbon fuels for fuel cell power plants with widely varying power generation requirements (e.g. less than 1 W to more than 100 kW). This has resulted in strong demand for revolutionary new approach(es) to reactor designs which feature scalability, multi-functionality, and hyper-integration of the required system components.

It would be desirable to have improved reactors for generating hydrogen from hydrocarbon fuels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 20 is a table showing equilibrium composition of product stream with and without hydrogen separation/removal (P=1 atm).

FIG. 21 is a table showing equilibrium composition of product stream with and without hydrogen separation/removal (P=10 atm).

FIG. 22 is a table showing equilibrium composition of product stream with and without hydrogen separation/removal (P=5 atm).

FIG. 23 is a table showing fuel mixture with recycled products.

FIG. 24 is a table showing reaction product output without (A) and with (B) recycling.

DETAILED DESCRIPTION

Disclosed herein are exemplary reactors that generate hydrogen from hydrocarbon fuels, naturally occurring or synthesized. These reactors are generally "batch-type" reactors featuring on-demand controlled volume, pressure, temperature, and reaction residence time. The reactors operate in a sequence of discrete sequential steps (rather than the state of the art continuous operation), each step being precisely controlled by an actuator (e.g. moving piston(s), flexible membrane, etc.) resulting in an optimal reactor volume, pressure, temperature, and species composition. The heaters/coolers and heat exchangers can be integrated as part of the reactor structure to achieve precise control of temperature. The reactors are outfitted with one or more intake/exhaust valves to move reactants and reaction products in and out of the reactor at an appropriate time/step of the entire process. Additionally, one or more of the walls of the reactor and/or actuator may be selectively permeable to one or more of the reaction products, resulting in product purification as well as shifting of reaction equilibrium in a favorable direction. Each reactor unit is optimized for performing a specific reaction or multiple reactions and/or separation steps, and the scale-up to required power is achieved by parallel operation of multiple identical units.

One embodiment of the reactor comprises a $CO_2/H_2$ active membrane piston inside a cylinder that provides for highly efficient and scalable hydrogen generation from hydrocarbon fuels. This embodiment may function in two or four stroke modes. Another embodiment of the reactor comprises a dual piston configuration having $CO_2$ and $H_2$ active membrane pistons inside a single cylinder. Other embodiments of the reactor comprise flexible membranes or diaphragms that operate in a manner similar to pistons. The disclosed reactors meet the challenges discussed in the Background section in a cost-effective, simple and elegant way, making them suitable for commercialization.

Figure 1:
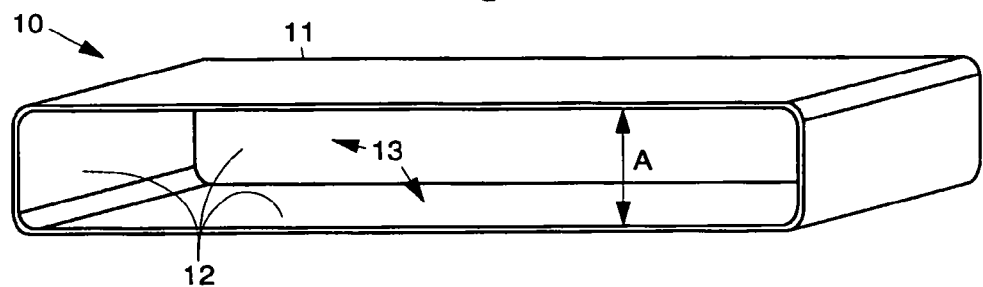
FIG. 1 illustrates an exemplary reaction chamber of an exemplary reactor.

Referring to the drawing figures, FIG. 1 illustrates an exemplary reaction chamber 11, or cylinder 11, of an exemplary reactor 10. Walls 12 of the exemplary reaction chamber 11 are loaded with one or more catalysts 13. The reaction chamber 11 preferably has a high aspect ratio. The critical dimension of the reaction chamber 11 is its thickness A, which is designed to be small with respect to diffusion length scales (computed based on the reaction time scale) to remove transport limitations (i.e., run reaction and separation at their intrinsic rates) as well as to provide a large specific surface area of the catalytically active surface.

Figure 2:
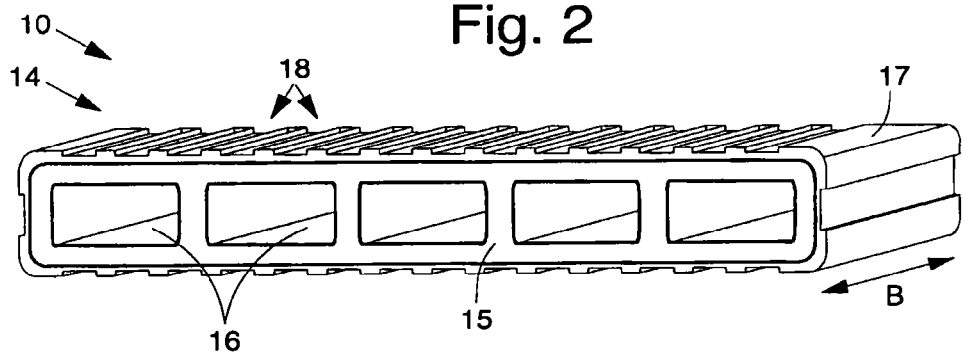
FIG. 2 illustrates a cutaway view of an exemplary membrane piston used in conjunction with the exemplary reaction chamber shown in FIG. 1.

FIG. 2 illustrates a cutaway view of an exemplary $CO_2/H_2$-selective membrane piston 14 used in the reactor 10. The $CO_2/H_2$-selective membrane piston 14 slides within the reaction chamber 11 shown in FIG. 1. The $CO_2/H_2$-selective membrane piston 14 comprises a porous structure 15 or substrate 15 having a plurality of flow channels 16 formed therein. The exterior surface of the porous substrate 15 of the membrane piston 14 comprises a selectively permeable membrane 17 whose exterior surface is configured to have a plurality of microgrooves 16 are formed therein.

The $CO_2/H_2$-selective membrane piston 14 and cylinder/reaction chamber 11 operate in a cycle similar to the internal combustion engine. Details of the design of the reactor 10 will now be discussed.

Details of the Reactor Design

Piston/cylinder assembly

In a preferred embodiment, the cylinder 11 features a high aspect ratio (in a planar slit shape-factor as shown in FIG. 1 or otherwise, e.g., the hollow-ribbed-chamber) and sufficient mechanical strength to withstand operating pressures and temperatures. The interior walls 12 of the cylinder 11 are coated with a mixture or a layered structure of catalysts 13 appropriate for the fuel reforming reaction at the optimal temperature (e.g., 200-300° C. for methanol) and for the water gas shift (WGS) reaction at lower temperatures (100-150° C.). The critical dimension of the cylinder 11, the slit thickness (A), can be made small enough to ensure that diffusive gas phase species transport from the bulk to the catalyst walls 12 is as fast or faster than the reaction kinetics. The high aspect ratio form factor of a slit cylinder design with a small thickness also results in a very high specific (per unit volume of the reactor) surface area of the catalyst, thus maximizing the power density (and throughput per unit volume) of the reactor 10.

The piston 14 (FIG. 2) fits snugly into the cylinder 11 and is constructed of a porous material (framework) with sufficient mechanical strength and durability at expected operating temperatures and pressures. The exterior walls of the piston 14 including its face are encased in highly selective and thin (~μm scale) $CO_2/H_2$ permeable membrane 17, which is not permeable to CO or $H_2O$. See U.S. Pat. No. 6,099,621 and Huang, J., El-Azzami, L., Ho, W. S. W., (2005) "Modeling of CO2-selective water gas shift membrane reactor for fuel cell", Journal of Membrane Science, 261 (1-2), 67-75, for examples of a $CO_2$ and $\{CO_2+H_2\}$ selective membrane, and Johannessen, E., Jordal, K., (2005) "Study of a H-2 separating membrane reactor for methane steam reforming at conditions relevant for power processes with CO2 capture", Energy Conversion and Management, 46 (7-8), 1059-1071, Barbieri, G., Violante, V., DiMaio, F. P., Criscuoli, A., Drioli, E., (1997) "Methane steam reforming analysis in a palladium-based catalytic membrane reactor", Industrial & Engineering Chemistry Research, 36 (8), 3369-3374, and Shu, J., Grandjean, B. P. A., Kaliaguine, S., (1994) "Methane Steam Reforming in Asymmetric Pd—Ag and Pd—Ag/Porous Ss Membrane Reactors", Applied Catalysis a-General, 119 (2), 305-325 for description and application of $H_2$ selective membranes. On the exterior of the piston 14 there may also be a network of very small, communicating gas flow channels 18 or grooves 18 (shown straight in FIG. 2 for illustration purposes only) in order to enhance the mixture contact area with the membrane 17 for selective removal of the $CO_2$ and $H_2$ from the reacting mixture during each reaction step. Within the piston 14 are flow channels 16 to provide efficient removal of permeate. Once again, the form factor of the piston 14 with high aspect ratio provides a large specific surface area of exposed permeable membrane 17 which enhances throughput of $CO_2/H_2$ removal while minimizing the total system volume.

The assembled piston 14 and cylinder 11 form two distinct reactor domains and pathways for the reactions to take place. The first is the bulk reaction chamber which is the volume between the face of the piston 14 and the "top" (intake end, as shown in FIG. 3, for example) of the cylinder 11. Here, the reaction mixture (reagents and products) interacts intimately with the catalyst 13 on the cylinder walls 12 and with the $CO_2/H_2$ selective membrane 17 covering the face of the piston 11. The second domain is the network of the flow microchannels formed by the cylinder walls 12 and the micro grooves 18 on the piston 11. Reaction mixture flowing through these channels 18 is simultaneously exposed to catalyst 13 on the inside of the cylinder walls 12 and the $CO_2/H_2$ selectively permeable membrane 17 on the exterior surface of the piston 14.

Reactor Operation

Figure 3A:
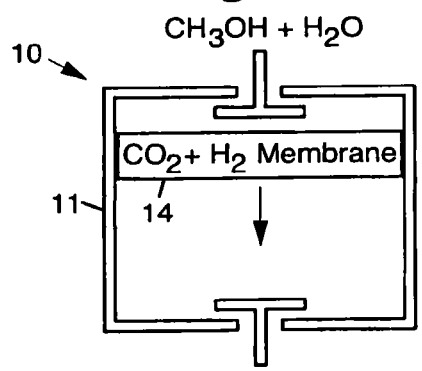
FIGS. 3a and 3b illustrate an intake stroke of the reactor.
Figure 3B:
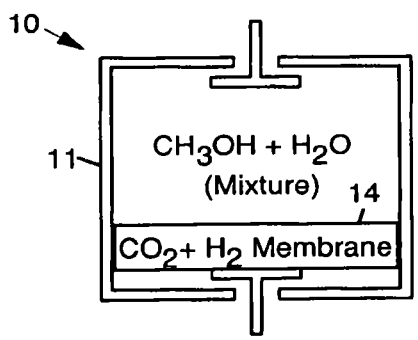
Figure 4A:
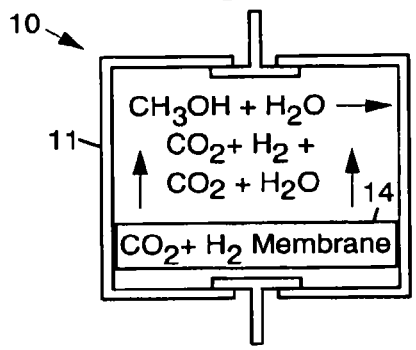
FIGS. 4a and 4b illustrate a compression stroke of the reactor.
Figure 4B:
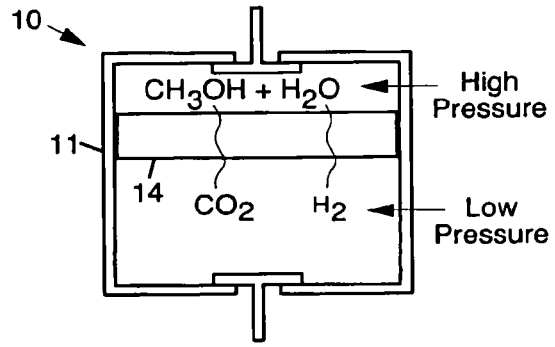
Figure 5A:
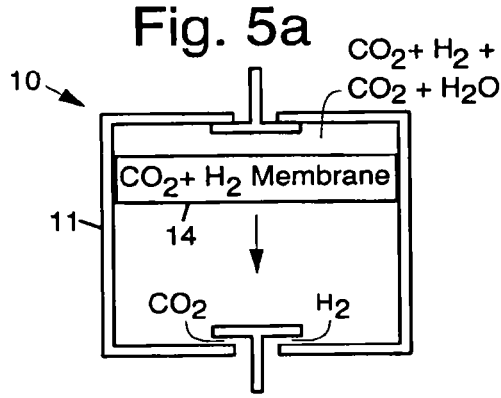
FIGS. 5a and 5b illustrate an expansion and product discharge stroke of the reactor.
Figure 5B:
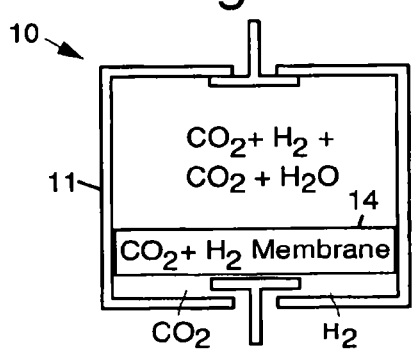
Figure 6A:
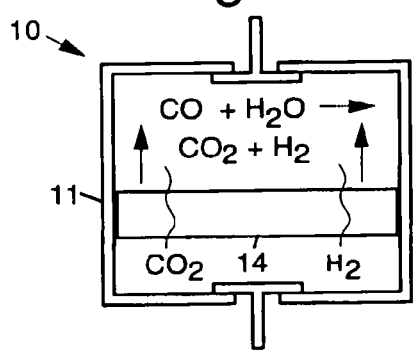
FIGS. 6a and 6b illustrate a CO cleanup stroke.
Figure 6B:
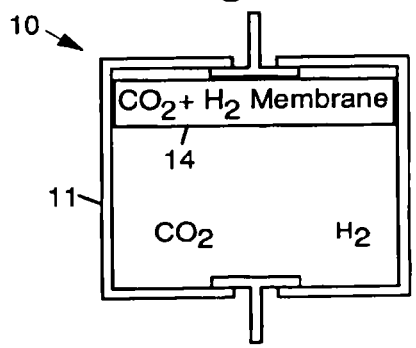
Figure 7A:
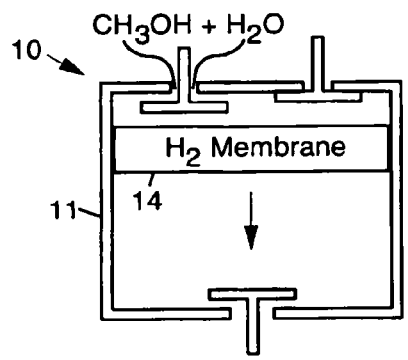
FIGS. 7a and 7b illustrate an intake stroke of the reactor of a Case II embodiment.
Figure 7B:
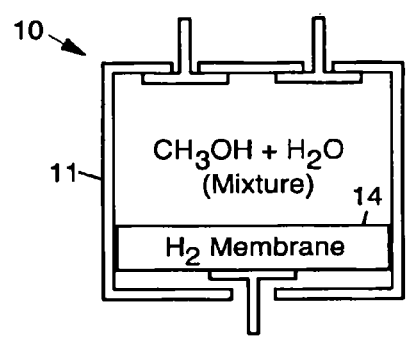

One example of the operational sequence of the reactor 10 is the four-stroke cycle described below and illustrated in FIGS. 3-6. FIGS. 3a and 3b illustrate an intake stroke of the reactor 10. FIGS. 4a and 4b illustrate a compression stroke of the reactor 10. FIGS. 5a and 5b illustrate an expansion and product discharge stroke of the reactor 10. FIGS. 6a and 6b illustrate a CO cleanup stroke.

The exemplary reactor 10 provides maximum fuel conversion by properly matching the process (i.e., piston dynamics), reaction, and separation time scales, and reduces/eliminates CO in the product stream to <10 ppm by forcing a favorable, non-equilibrium reaction state at each stroke of the cycle via active removal of $CO_2$, $H_2$, or both $CO_2$ and $H_2$ from the reaction chamber through the highly permeable, selective piston membrane 17.

Case I $CO_2+H_2$ Selective Membrane Integrated with the Piston

Stroke 1

Intake

The first stroke (FIG. 3a) fills the reaction chamber 11 (cylinder 11) with a methanol and water vapor mixture. Ideally, the water/carbon ratio of the mixture is unity, but in practice this ratio needs to be optimized for various operating conditions. The walls 12 of the reaction chamber 11 are loaded with a catalyst 13 or a mixture of catalysts 13 that are highly active for fuel (e.g., methanol) decomposition and steam reforming at intermediate temperatures (e.g., ~250° C. for methanol) and water gas shift (WGS) reaction at lower temperatures (~120° C.). During this stroke, intake and exhaust valves are open.

Stroke 2

Compression

With both valves closed, the piston 14 starts at the bottom (FIG. 4a) and moves up, compressing the mixture. Compression of the mixture raises the temperature, which is favorable for the endothermic steam reforming reaction [Eqs. (1) and (2)]. If needed, heat may be added to maintain the optimal operating temperature. High pressure in the reaction chamber 11 forces permeation of $H_2$ and $CO_2$ (products of the fuel reforming reaction) through the selectively-permeable membrane 17 integrated with the piston 14, and these products are collected on the backside of the piston 14. It should be noted that the membrane 17 is designed to be permeable to $H_2$ and $CO_2$ only, and it is not permeable to CO, a product that poisons the catalyst of fuel cells. Removal of $H_2$ and $CO_2$ from the reaction chamber shifts the reaction equilibrium towards the products, ensuring maximum (ideally 100%) conversion of fuel/methanol. Since piston motion is controlled, the speed of the compression process can be made to perfectly match the reaction kinetics and permeation time scales to achieve the optimal physicochemical conditions for reaction and separation.

A portion of the mixture that has not had sufficient time to react in the "bulk" reaction domain of the cylinder 11 (above the piston) has a route for passage around the edges of the piston 14 (via micro grooved surface forming the network of microchannels 18 in the piston 14, where it remains in contact with the cylinder wall-deposited catalyst 13 and thus further converted to products. Simultaneously, $H_2$ and $CO_2$ are separated from the mixture as they are being produced in the same flow microchannels 18 by permeation through the piston-integrated selective membrane 17 into the part of the cylinder 11 where only desired products ($H_2$ and $CO_2$) are collected. Because the reactions (Eqs. (1) and (2)) are endothermic, temperature will gradually decrease in the flow direction (opposite to the direction of the piston motion). At these lower temperatures, the thermodynamic conditions become favorable for the water gas shift [Eq. (3)] reaction to proceed at a significant rate. This results in further generation of hydrogen and conversion of CO into $CO_2$. Taking advantage of simultaneous removal of $H_2$ and $CO_2$ from the mixture, via pressure-driven permeation across the piston-integrated selective membrane 17, the reaction equilibrium could be dramatically shifted and maximum (ideally 100%) conversion of CO into $CO_2$ is achieved. At the outlet of the microchannel network only residual amounts of $H_2$ and $CO_2$ that did not permeate across the piston-integrated membrane 17 remain.

Stroke 3

Expansion

With the piston 14 near the top of the cylinder 11 and a pure mixture of $H_2$ and $CO_2$ at the backside of the piston, the bottom valve is opened (FIG. 5a) and the piston 14 moves down. The $H_2+CO_2$ mixture is pushed out through the valve to a collection chamber or directly to the fuel cell. The bottom part of the cylinder 11 is structurally designed in such a way that it can accommodate the topography of the piston elongated hollow-structure with minimal (optimally none) dead volume present between the piston 14 and cylinder 11 when the former reaches the very end of the expansion stroke in the cylinder 11. Further, the expansion of the remaining mixture in the reaction chamber (above the piston 11) lowers the temperature to approximately 120° C. This is a thermodynamically favorable condition for the water gas shift (WGS) reaction which is exothermic (heat releasing and therefore favored at reduced temperature). If needed the chamber may be further cooled externally to achieve the optimal temperature for the WGS reaction.

Stroke 4

Final CO Cleanup

As is shown in FIGS. 6a and 6b, the bottom valve is closed, the piston 14 is initially near the bottom of the cylinder 11, and a mixture of CO, $H_2O$, and residual $H_2$ and $CO_2$ is in the reaction chamber above the piston 14. The piston 14 moves up and the WGS reaction proceeds while the mixture is being compressed. The resulting pressure difference across the piston-integrated membrane 17 drives permeation of $H_2$ and $CO_2$ which shifts the equilibrium of the WGS reaction [Eq. (3)] towards the desired products (i.e., from CO and $H_2O$ to $H_2$ and $CO_2$). Once again, the compression process can be made to proceed at the optimal speed, which matches the residence time with the time scale imposed by the chemical kinetics of the WGS reaction. Further, the unreacted mixture proceeds along the path around the edges of the piston 14 in a similar manner to that described in Stroke 2 above, with the WGS reaction continuing along the length of the piston-embedded microchannels 18 until maximum (ideally 100%) conversion of CO into $CO_2$ has been achieved. When the piston 14 reaches the top of the cylinder 11 (FIG. 6b), all of the CO has been converted to $CO_2$, and all of the $H_2$ and $CO_2$ have been pushed out of the reaction chamber through the piston-integrated selective membrane 17 and now reside at the backside of the piston 14 in the product collection domain of the cylinder 11. The reactor 10 is now ready to complete the cycle (i.e. return to Stroke 1), wherein the top valve is opened and the piston 11 moves down, bringing in fresh reactants and sending the products ($H_2$ and $CO_2$) out to the collection chamber or directly to the fuel cell.

Alternative 2

Two-Stroke Operation

An alternative mode of operation is a two-stroke cycle. The first stroke is the same as Stroke 1 in the 4-stroke cycle described above. The second stroke is the compression stroke, which proceeds until all of the initial reagents are converted into $H_2$ and $CO_2$ and removed from the reaction chamber of the cylinder 11 through the piston-integrated selective membrane 17 or around the sides of the piston 14 through the membrane/reactor microchannels 18. At the completion of the second stroke, the reaction chamber is empty and the reactor 10 is ready for Stroke 1 again, wherein the $H_2$ and $CO_2$ behind the piston 14 are discharged out to the fuel cell through the valve at the bottom of the cylinder 11. In the two-stroke scenario the reactor 10 operation is further simplified, although this may not allow one to maintain the most optimal conditions for all chemical reactions and mixture separation steps due to the endothermic and exothermic reactions and separation processes taking place simultaneously.

Case II $H_2$ Selective Membrane Integrated with the Piston

Figure 8A:
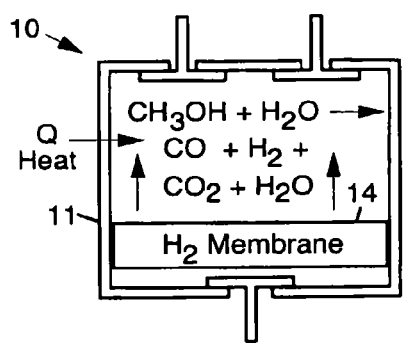
FIGS. 8a and 8b illustrate a compression stroke of the reactor of the Case II embodiment.
Figure 8B:
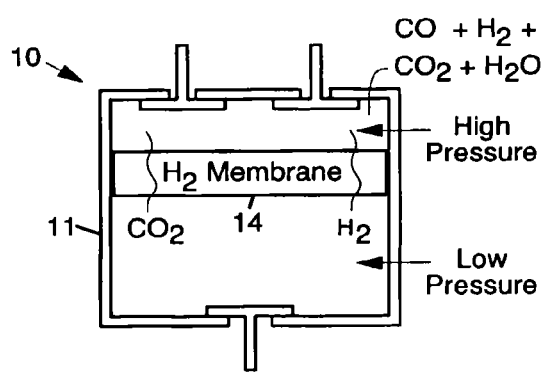
Figure 9A:
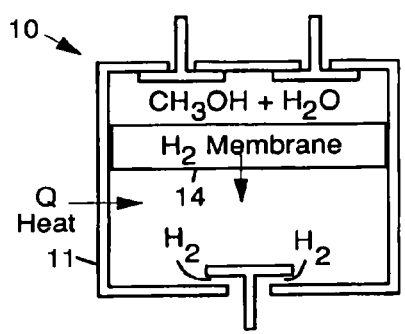
FIGS. 9a and 9b illustrate a expansion and product discharge stroke of the reactor of the Case II embodiment.
Figure 9B:
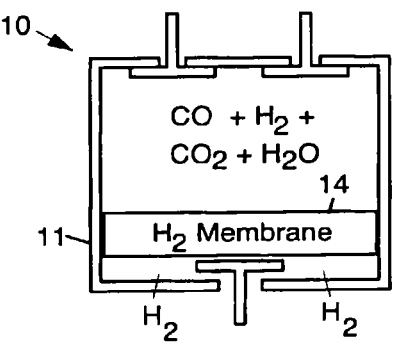
Figures 10A, 10B, 10C:
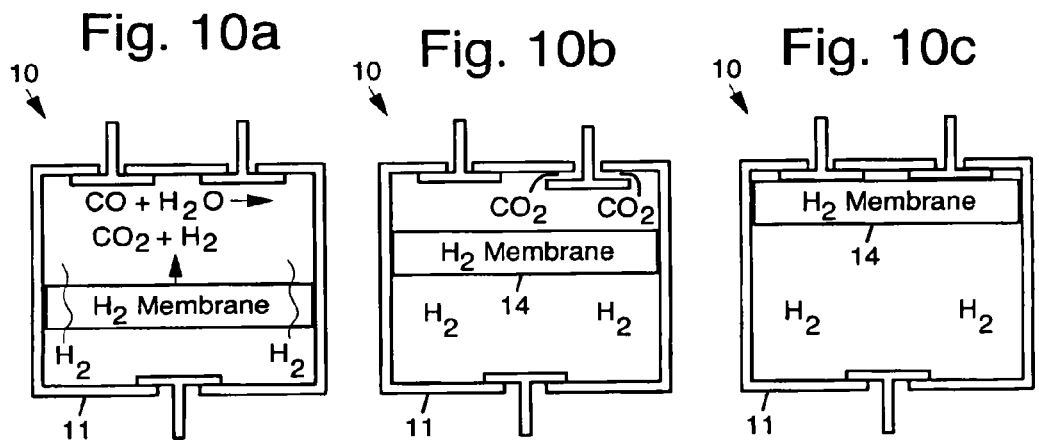
FIGS. 10a-10c illustrate a CO cleanup stroke of the reactor of the Case II embodiment.

In another embodiment, the membrane piston 14 is selectively permeable to $H_2$ only. The operation sequence and the cycle are very similar to Case I (i.e., for $CO_2$+$H_2$ selective membrane 14) previously described with several variations indicated in FIGS. 7-10. In particular, during the compression stroke (FIGS. 8a and 8b), only $H_2$ permeates the membrane, resulting in potentially pure $H_2$ on the backside of the piston 14. During the expansion stroke (FIGS. 9a and 9b), pure $H_2$ is pushed out of the cylinder 11 through the open valve at the bottom, either to a collection chamber or directly to the fuel cell power plant. The final CO cleanup stroke (FIGS. 10a and 10b) results in maximum conversion of CO to $CO_2$ (via the WGS reaction), and effectively separates the products ($CO_2$ and $H_2$) as $H_2$ permeates the membrane 17 and $CO_2$ remains at the top of the cylinder 11 in the bulk reaction chamber. The $CO_2$ is pushed out of the cylinder through an open valve at the top of the cylinder 11 and collected for sequestration (in this embodiment there are two valves at the top of the cylinder 11, one for intake of reactants and one for removal of $CO_2$). The reactor 10 is ready to begin the next cycle (i.e. return to Stroke 1), wherein the top intake valve is opened and the piston moves down, bringing in fresh reactants and sending $H_2$ out to the collection chamber or directly to the fuel cell.

Case III $CO_2$ Selective Membrane Integrated with the Piston

An additional embodiment is that of a membrane piston 14 which is selectively permeable to $CO_2$ only. The operation sequence and the cycle are substantially identical to Case II (i.e., for $H_2$ selective membrane 14) described above except that domains for $CO_2$ and $H_2$ collection are switched in FIGS. 7-10. During the compression stroke (FIGS. 8a and 8b), $CO_2$ rather than $H_2$ permeates the membrane 17, resulting in potentially pure $CO_2$ on the backside of the piston 14. During the expansion stroke (FIG. 9), pure $CO_2$ is pushed out of the cylinder through the open valve at the bottom, and collected for sequestration. The final CO cleanup stroke (FIGS. 10a and 10b) results in maximum conversion of CO to $CO_2$ (via the WGS reaction), and effectively separates the products ($CO_2$ and $H_2$) as $CO_2$ permeates the membrane and $H_2$ remains at the top of the cylinder 11 in the bulk reaction chamber. The $H_2$ is pushed out of the cylinder 11 through an open valve at the top of the cylinder 11 (in this embodiment there are two valves at the top of the cylinder 11, one for intake of reactants and one for removal of $H_2$). The reactor 10 is ready to begin the next cycle (i.e. return to Stroke 1), wherein the top intake valve is opened and the piston moves down, bringing in fresh reactants and sending $CO_2$ out to the collection chamber for sequestration.

Additional Embodiments

Figure 11:
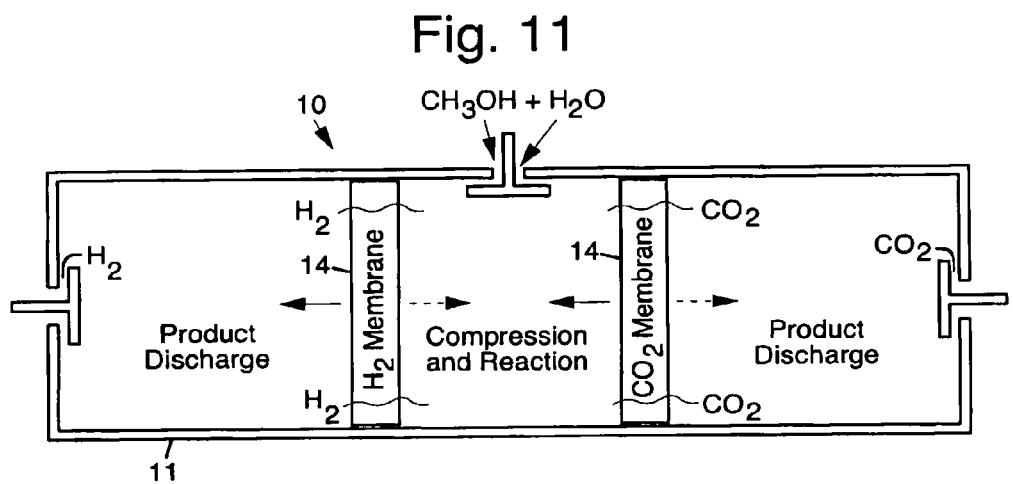
FIG. 11 illustrates an exemplary dual piston configuration of the reactor.

The above descriptions of the operation of the reactor 10 for steam reforming of methanol are only exemplary. In addition, to the configurations described above, with single cylinder 11 and single piston 14, additional embodiments may use multiple pistons 14 inside a single cylinder 11, multiple pistons 14 and reaction chambers, or different cylinders 11 for each reaction step. For example, as shown in FIG. 11, the configuration with two pistons 14 (one is selectively permeable to $H_2$ and another one is selectively permeable to $CO_2$) moving in opposite directions enables a 2 or 4 stroke cycle with reagent intake, compression, reaction, product separation, and discharge, resulting in 100% fuel conversion, complete CO-removal, and full separation of desired products ($H_2$ and $CO_2$). The sequence of operations and cycle descriptions are very similar to those described above, with minor variations depending on the configuration that is selected. Variations in piston/cylinder design, sequence of operations, valve timing, piston motion and process time scales, temperature or pressure cycling, material selection, or any other reasonable variation that may arise may be employed in producing the reactors 10.

The exemplary reactors 10 can operate on any natural or synthetic hydrocarbon fuel from natural gas to kerosene. For the purpose of illustration of the general design and operating principles of the reactor 10, methanol is used as the fuel being processed by the reactor 10. In addition to adding specificity to the example illustrating this general inventive concept, the choice of methanol has a number of attractive features making it potentially a preferred synthetic fuel for transportation applications. These include (1) its state as a liquid under normal atmospheric pressure and temperature (i.e., allowing high energy density on-board storage), (2) high hydrogen content (per each carbon atom in the fuel), (3) ease of conversion into the gas phase prior to catalytic processing due to its low saturation temperature (~50° C.) at atmospheric pressure, and (4) the availability of well-developed processes and industrial scale facilities for methanol synthesis from a variety of feedstocks.

The above-described reactors 10 enjoy several key advantages over traditional reactors.

First, the residence time of the mixture in the reaction chamber can be controlled precisely via operator-specified speed of the piston motion at each stroke, thus ensuring the most optimal reaction conditions at each reaction step leading to maximum conversion rates and selectivity towards desired products.

Second, the reactor is fundamentally operating in a transient (unsteady or periodically-steady-state) mode and each reaction step is being forced to proceed in the most favorable direction, taking advantage of imposed non-equilibrium chemistry conditions.

A third advantage is the scalability of the reactor 10. Individual reactor units are optimized for size, throughput, and operating conditions as dictated by the optimal chemistry of the process. Multiple reactors can be then stacked and operated in tandem (in, out, or with a time-shift of phase with each other) to produce a continuous stream of products at a desired rate matched to the end-use application. Based on the required hydrogen generation rate, only the necessary number of reactor units needs to operate at any given time, and if the power demand changes, fewer or a greater number of reactors can immediately be brought on (or off) line to provide the required flow of hydrogen. Unlike traditional continuous-flow reactors, the individual reactor units can always operate at their optimal throughput, while the dynamic changes in load and system transients can be accommodated by bringing greater or fewer reactors into operation almost immediately.

A fourth advantage is its compact size and design/operation simplicity, which is a direct result of the integration of multiple chemical/transport processes and components into a single unit. Fuel decomposition and reforming, water gas shift reaction, mixture compression and expansion, and separation of desired products are all accomplished in the same location with shared hardware. Because of the high specific surface area of the cylinder-bound catalyst 13 and of the piston-integrated $H_2/CO_2$ selective membrane 17 in the reactor 10, the reaction and separation steps are very efficient even when they are fundamentally kinetically or equilibrium limited. Further, the form factor of the reactor 10 (exploiting high aspect ratio structures with small dimensions in the direction important to species transport) leads to very efficient heat and mass transfer, making all reactions never transport-limited and minimizing size and weight.

A fifth advantage deals with the unique capability to pre-concentrate and separate not only hydrogen (a desired feedstock for the power-producing fuel cell), but also carbon dioxide as the only two eventual products of the fuel processing sequence. Thus, there is a unique capability for adding one more extra step downstream of the reactor to sequester carbon dioxide from the product stream via either liquefaction or an appropriate chemical reaction. This enables on-board sequestration of carbon dioxide, a major contributor to the greenhouse effect, which is an especially difficult and, at the present moment, unresolved task for transportation sector.

A sixth advantage of this reactor 10 is that a relevant body of knowledge and capability has been developed through the 100+ years of experience with internal combustion engines. State of the art piston/cylinder engine technology is remarkably advanced including design, manufacturing, operation, control, efficiency, and cost, which should enhance commercialization.

Figure 12:
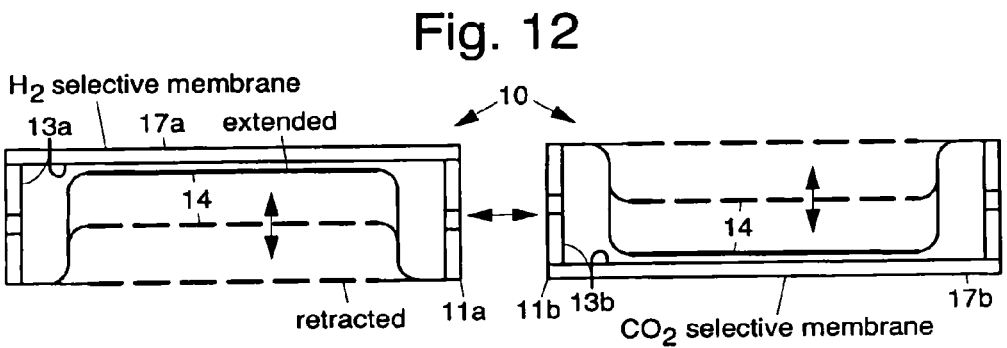
FIG. 12 shows a exemplary flexible membrane reactor for hydrogen and $CO_2$ production and separation.
Figure 17:
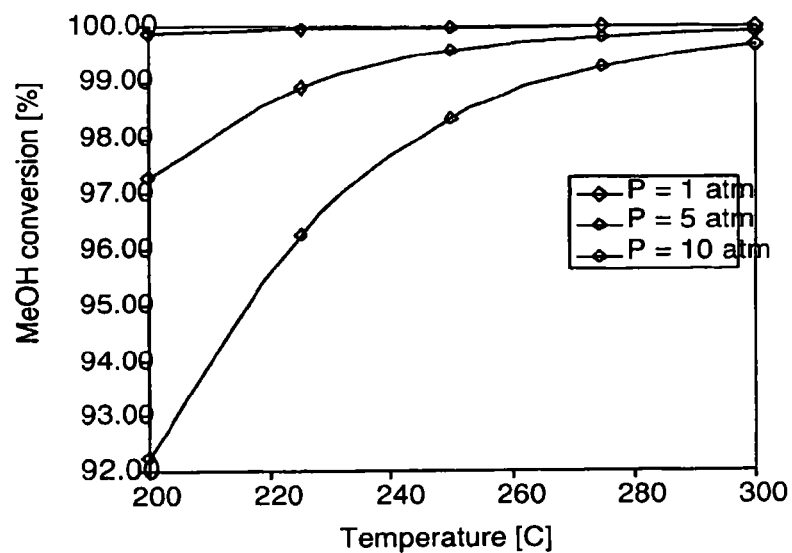
FIG. 17 is a graph that illustrates methanol conversion for various temperatures and pressures
Figure 18:
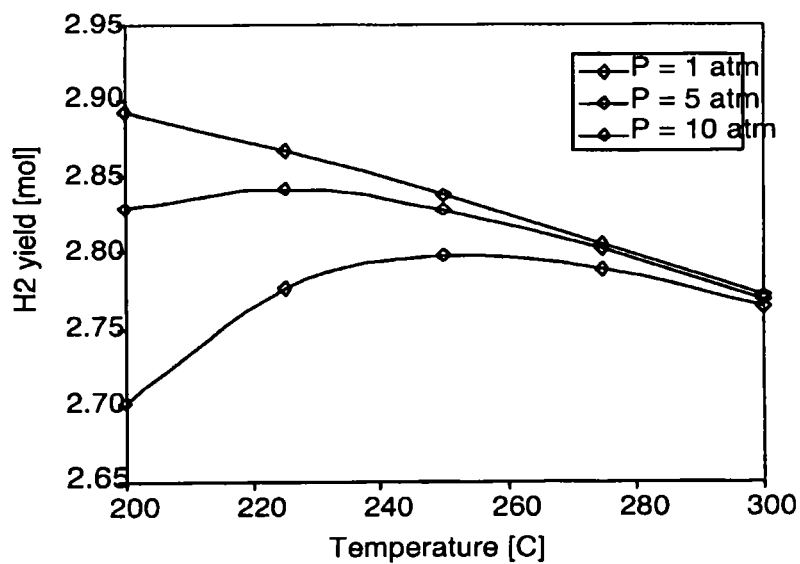
FIG. 18 is a graph that illustrates hydrogen yield at various temperatures and pressures.

Flexible Actuated Piston/Diaphragm Designs and Regenerative Operation of the Reactor Referring to FIGS. 12-16, discussed below are flexible membrane reactors 10 comprising a flexible piston 14 or diaphragm 14. As is shown in FIGS. 12a and 12b, the flexible membrane reactors 10 comprise two fluidically-communicating chambers 11a, 11b. A reforming/hydrogen reaction chamber 11a is shown in FIG. 12a, and a water-gas shift WGS/$CO_2$ reaction chamber 11b is shown in FIG. 12b, for example. Calculated data are provided in FIGS. 17-19. Steam reforming of methanol is discussed for illustrative purposes only, as any natural or synthetic hydrocarbon fuel can be reformed by the described reactor.

Flexible Actuated Piston/Diaphragm Embodiment I

A first embodiment of the flexible actuated piston/diaphragm reactor 10 is shown in FIG. 12. The reactor 10 comprises two similarly designed planar high-aspect ratio chambers 11a, 11b featuring high specific (per unit volume) surface area, a steam-reforming, hydrogen-selective membrane 17a (left side of FIG. 12), and a water-gas-shift, $CO_2$-selective membrane 17b (right side of FIG. 12). The two chambers 11a, 11b are in fluidic communication with each other. Each chamber 11a, 11b has a flexible, externally actively controlled diaphragm 14 or a piston 14 which enables the desired operating pressure inside the chambers 11. The piston/diaphragm 14 can be actuated (moved up/down) using electrostatic, electromagnetic, hydraulic, or any other method, and with or without use of edge-integrated bellows coupling. The internal walls of each chamber 11 and piston 14 are coated by catalysts 13a, 13b which enable a specific reaction to proceed.

Figure 13:
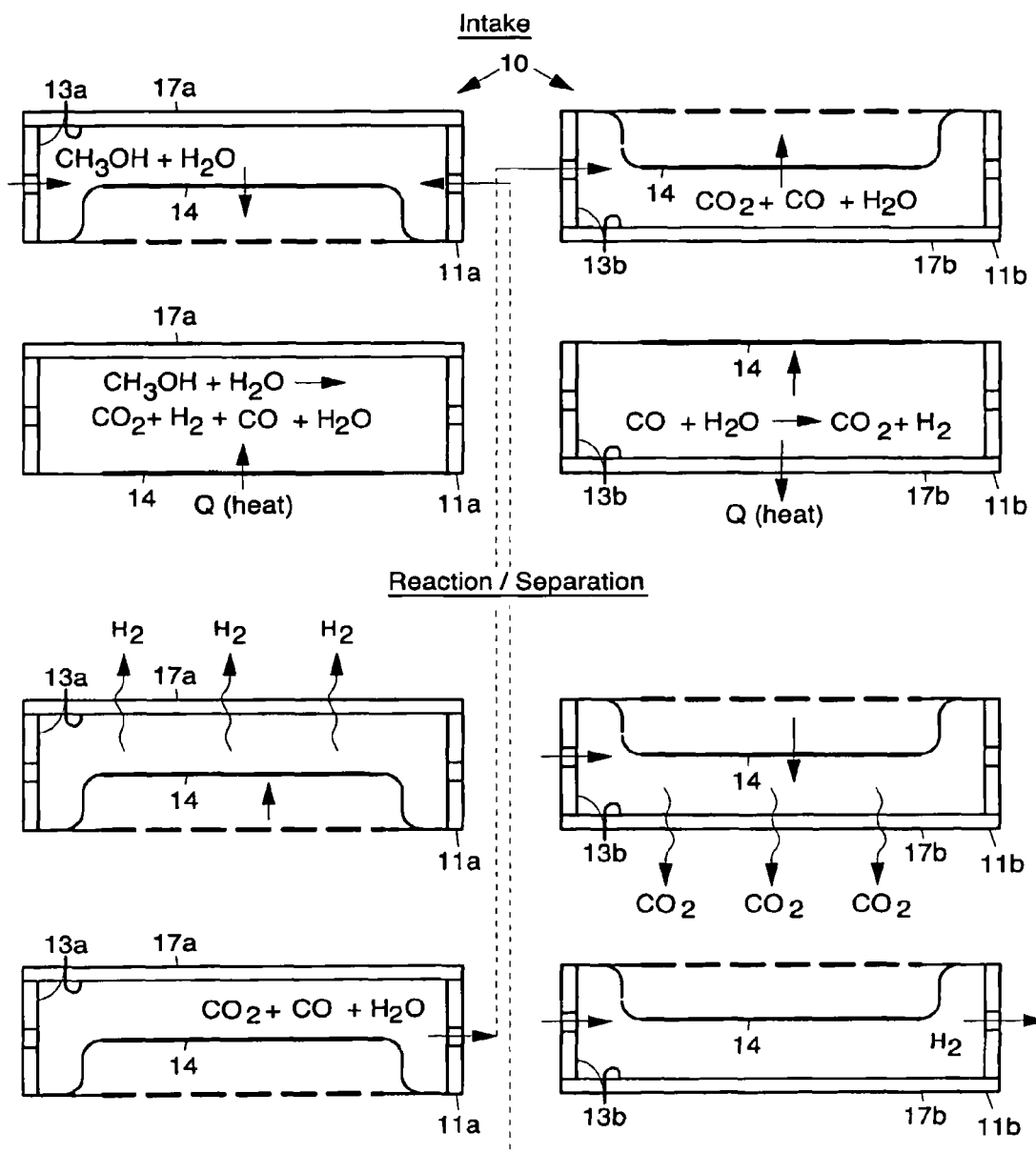
FIG. 13 shows operation of the flexible membrane reactor.

The reactor 10 operates in a two step repeating sequence (cycle) as shown in FIG. 13. To illustrate the operation of the reactor 10, steam reforming of methanol is used as an example. However, the reactor 10 can be made to produce purified hydrogen and carbon dioxide from any hydrocarbon fuel.

The first step is the intake of fuel and water by the reforming/hydrogen reaction chamber 11 (left side of FIG. 13), and the intake of residual reforming reaction products from the WGS/$CO_2$ reaction chamber 11 after completion of the previous cycle (dashed line in FIG. 13 shows direction of the reagent flow). The pistons/diaphragms 14 are initially in the extended position and begin to retract drawing in reactants. At the end of this step, the pistons/diaphragms 14 are in their fully retracted position, reactants are in the reaction chambers, and the respective reactions begin to proceed.

In step 2, the reactions proceed to completion as the pistons/diaphragms slowly compress the mixture at the rate required by the reaction and permeation processes. Simultaneously, hydrogen is permeating through the hydrogen selective membrane on the left, and $CO_2$ is permeating through the membrane on the right. The hydrogen is captured and either stored or sent directly to the fuel cell. The $CO_2$ is captured and stored until it can be properly disposed of. The steam reforming reaction indicated in FIG. 13 is endothermic, requiring the addition of heat to maintain the temperature at 200-300° C., although the temperature of mixture may be sufficiently increased solely by its compression. The water gas shift reaction is slightly exothermic, requiring heat removal to maintain the temperature at 100-150° C. Because of the large specific surface area of the chamber no additional cooling other than natural circulation of ambient air may be needed to maintain optimal operating temperature. As the reaction and separation proceed simultaneously, the piston/diaphragm extends as necessary compressing the mixture to maintain an increased total (and therefore partial) pressure and thus enhance permeation. Finally, when the reactions and permeation processes reach their ultimate equilibrium state, the remaining products are pushed out of the chambers and the system is ready to return to the first step.

In this embodiment the two reactor portions operate in phase, both performing the similar operations at the same time in a one-to-one cycle. The exhaust stream from the hydrogen chamber 11a becomes the intake stream for the $CO_2$ chamber 11b on the next cycle, and the exhaust from the $CO_2$ chamber 11b can be recycled back into the fuel stream on the next cycle. Ideally, only pure hydrogen remains after water gas shift in the $CO_2$ chamber 11b. In reality, the reaction and separation processes are non-ideal, and the remaining mixture will contain methanol, $H_2$, CO, and $CO_2$ which should be recycled for full recovery. In general, however, the two reactor chambers 11a, 11b (reforming/hydrogen and WGS/$CO_2$) may or may not operate in phase or via the one-to-one cycle. That is, the phase-shifted (in time domain) operation may be more optimal under certain conditions, as well as one or more WGS/$CO_2$ reaction chambers 11a, 11b may be needed to operate in conjunction with a single reforming/hydrogen chamber (and vice versa) to achieve the best performance. This is determined by the relative magnitude of characteristic time scales for the reforming and WGS reactions as well as $H_2$ and $CO_2$ separation, processes for any given fuel. The capability for external control of the piston (diaphragm) motion (i.e., speed/rate of production and compression ratio/selectivity and yield) should allow one to operate the reactor 10 in its most optimal mode.

Flexible Actuated Piston/Diaphragm Embodiment II

The second embodiment of the flexible actuated piston/diaphragm reactor 10 takes advantage of the fact that the two independently-controlled reacting units of the reactor 10 (i.e., reforming/hydrogen and WGS/$CO_2$) may be timed to operate in-phase and in a one-to-one cycle. The piston/diaphragm 14 is modified to operate in a bi-directional mode, wherein it may extend in either direction (up or down), thus changing the volume/pressure in both a membrane reaction chamber "in front" as well as a collection chamber "behind" each unit of the reactor 10. The two reactor chambers 11a, 11b are integrated into a single reactor 10 via inter-connected passageways and valves between the reaction and collection chambers. The operation is similar to that previously described for embodiment I, but with several modifications as shown in FIGS. 14-16.

Figure 14:
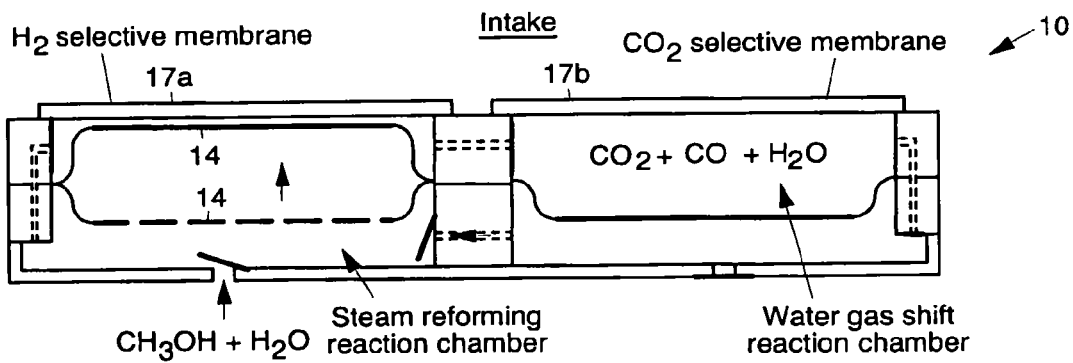
FIG. 14 illustrates an intake stroke of the flexible membrane reactor.

Referring to FIG. 14, the combined cycle begins with the intake stroke, wherein the piston/diaphragm 14 within the reforming/hydrogen unit (left part of the figure) moves into its "up" position. During this up-stroke, the unreacted/unseparated mixture from the collection chamber of the WGS unit shown on the right and a fresh mixture of fuel and water vapor are drawn into the collection chamber (at the bottom) of the reforming/hydrogen unit.

Figure 15:
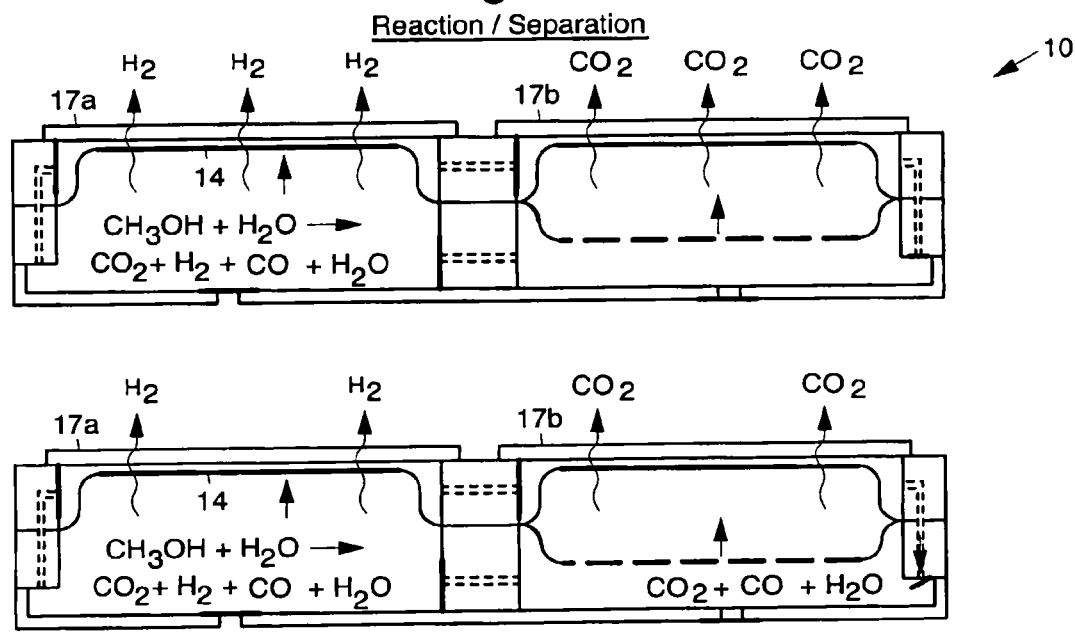
FIG. 15 illustrates a reaction/separation stroke of the flexible membrane reactor.

Referring to FIG. 15, in step 2, the valves are closed and the piston/diaphragm in the WGS/$CO_2$ reaction unit (shown on the right side of the figure) moves to the up position. During the upward motion of the piston, water-gas shift (WGS) reaction ($CO+H_2O \rightarrow CO_2+H_2$) and $CO_2$ permeation (removal) occur simultaneously in the top "reaction" chamber of the WGS/$CO_2$ reaction unit. Meanwhile in the reforming/hydrogen unit, hydrogen is permeating through an $H_2$ selectively permeable membrane, and the steam reforming reaction is proceeding in both the upper ("reaction") and lower ("collection") chambers. When the reaction and permeation processes approach their ultimate equilibrium, a valve at the right connecting the upper ("reaction") and lower ("collection") chambers of the WGS/$CO_2$ unit opens and the mixture remaining in the "reaction" WGS/$CO_2$ chamber is sucked into the "collection" WGS/$CO_2$ chamber.

Figure 16:
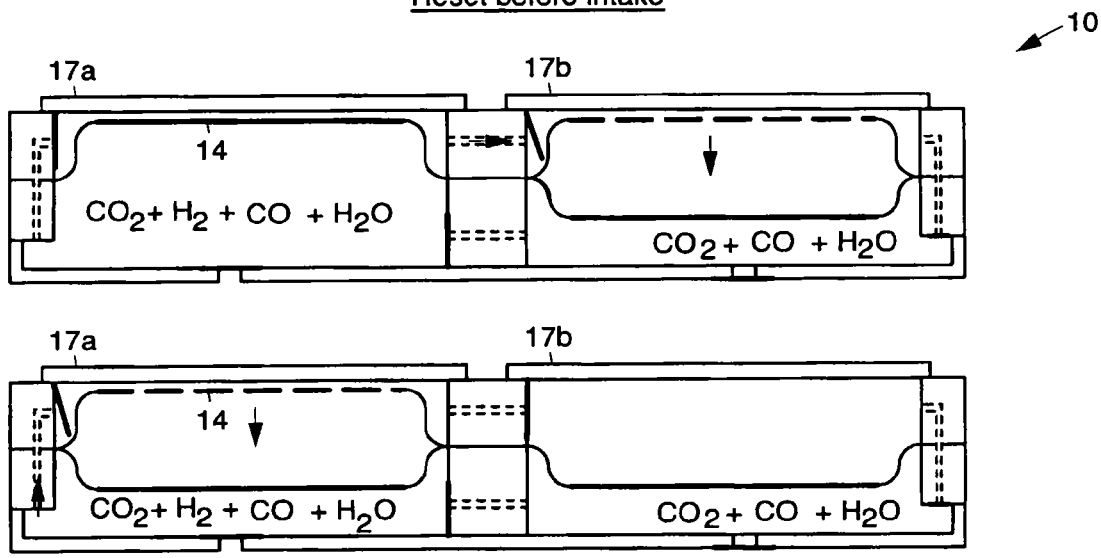
FIG. 16 illustrates reset of the flexible membrane reactor.

Referring to FIG. 16, finally in step 3, the system returns to its initial state to prepare for the next intake stroke. The piston/diaphragm 14 in the WGS/$CO_2$ reaction unit moves down, the valve connecting the reforming/hydrogen unit and the WGS/$CO_2$ unit opens up and the retentate mixture from the "reaction" chamber of the reforming/hydrogen unit is drawn into the "reaction" chamber of the WGS/$CO_2$ unit. Next, the valve between reforming/hydrogen and WGS/$CO_2$ unit closes, and the piston/diaphragm in the reforming/hydrogen unit moves down, while opening the valve between the "reaction" and "collection" chambers of the reforming/hydrogen unit and pushing the reformate mixture from the lower "collection" chamber into the upper "reaction" chamber of this unit. The system has completed a cycle and is ready to proceed to the intake step shown in FIG. 14.

Regeneration/Recycling of "Waste" Products

The regenerative reactor 10 just described achieves 100% fuel utilization as well as 100% separation/purification of both the hydrogen and byproduct $CO_2$ generated as reaction products. This is a significant development from a practical viewpoint, considering that by using the described designs and process organization (embodiment I & II) it is no longer required that any of the individual steps in the process (steam reforming, hydrogen separation, WGS reaction, and $CO_2$ separation) operate at their ideal limit. Rather the individual steps should proceed as far as practically possible and then the remaining unreacted or unseparated products are recycled back into the fuel stream to be used during the next cycle of the system.

In typical conventional hydrogen-selective membrane reactors, only $H_2$ is separated from the reformate (products). Hydrogen separation via a selectively permeable membrane relies on a partial pressure difference of hydrogen across the membrane. As hydrogen is removed from the reformate mixture, both total pressure and $H_2$ concentration fall, leading to a precipitous drop in $H_2$ partial pressure. Because the $H_2$ partial pressure on the permeate side is not zero, some hydrogen will always be left on the retentive side. A trade-off occurs between minimizing the residence time of the mixture in the membrane reactor, and maximizing the percentage of hydrogen that is recovered. The leftover retentive mixture is enriched in $CO_2$, yet still contains $H_2$ and CO, which are both valuable fuels. Small, incremental improvements in hydrogen recovery generally require large increases in system volume (to increase residence time and improve $H_2$ permeation) if one is to use the currently practiced process organization.

The high $CO_2$ concentration in this waste stream suggests that it is feasible to separate a large percentage of the $CO_2$ (via a $CO_2$ selectively permeable membrane, following its liquefaction for storage, or other method) and then recycle the remaining valuable products (CO, $H_2O$, $H_2$) back into the fuel stream. This results in 100% fuel utilization as well as separating 100% of the byproduct $CO_2$ for sequestration and storage. $CO_2$ is believed to be one of the major contributors to anthropogenically induced climate change and thus may be viewed as a potentially dangerous environmental pollutant. Therefore, the described embodiments I and II (FIGS. 12-16) and unique process organization of the reactor technology (i.e., via enabling the optimal timing of reactions, simultaneous separation of products, and regeneration of the exhaust stream) should have application to any system where it is desirable to convert hydrocarbon fuel to pure hydrogen without wasting any fuel and without emitting carbon dioxide to the environment.

To demonstrate this capability and establish the ideal limit of how the reactors 10 are expected to operate, a thermodynamic analysis of a methanol steam reforming, hydrogen-selective membrane reactor 10 was carried out. Several realistic scenarios are investigated using equilibrium calculations of the species concentrations, including $CO_2$ removal from the reformate and recycling of the remaining mixture (including $H_2$, CO, and $CO_2$) back into the fuel stream. It is demonstrated that the fuel mixture intake and composition can be adjusted according to the quantity and composition of the recycled products to establish periodic quasi-steady state operation of the reactor, wherein the fuel input and hydrogen recovery per cycle are constant. As one would expect, the hydrogen production per cycle is slightly lower than if no recycling took place; however, this comes with the tremendous benefit of wasting no fuel as compared to the case when incompletely-reacted "exhaust" rich in potent, fuel-suitable components (e.g., CO) is simply discharged to the environment.

Equilibrium Calculations

Ideally, in steam reforming of methanol ($CH_3OH$), one mole of $CH_3OH$ and one mole of water vapor react to yield 3 moles of $H_2$ and one mole of $CO_2$. Because of methanol decomposition and the water gas shift (WGS) reaction, the net steam reforming reaction is

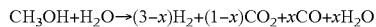

$$CH_3OH + H_2O \rightarrow (3-x)H_2 + (1-x)CO_2 + xCO + xH_2O$$

where x is the fraction of carbon in the fuel that is oxidized to CO rather than $CO_2$ (via WGS or methanol decomposition). The equilibrium concentrations of reactants and products are calculated from the equilibrium reaction constants (thermodynamic data), which depend on temperature and total pressure. For illustrative purposes these calculations are carried out for the temperature range of 200-300° C. and pressure range of 1-10 atmospheres.

Methanol conversion (FIG. 17) increases with temperature because the steam reforming reaction is endothermic, and decreases with increasing pressure because the number of moles of products exceeds the moles of reactants by approximately 2:1.

Hydrogen yield (FIG. 18) is slightly less than ideal (3 moles of $H_2$ per mole of reactant) across the temperature and pressure ranges shown. Hydrogen yield decreases slightly with increasing temperature (for P=1 atm) because it is consumed in the reverse WGS reaction ($CO_2+H_2 \rightarrow CO+H_2O$), which is favored at higher temperatures. At elevated operating pressures, hydrogen yield initially increases with temperature as methanol conversion increases, but then decreases at higher temperatures as the effects of the WGS reaction become more pronounced. Although hydrogen yield is very high (more than 90% of the ideal limit), the hydrogen is not pure, but is mixed with 1-5% CO, 15-20% $CO_2$, and trace amounts of unreacted $CH_3OH$.

Reactions with Hydrogen Separation

In the reactors 10, hydrogen is separated from the products as the reaction is occurring. The amount of hydrogen removed depends on the partial pressure difference of hydrogen between the reaction and permeate sides. Thus, the partial pressure of hydrogen on the reaction side must always be greater than or equal to that on the permeate side. For illustrative purposes equilibrium calculations of a hydrogen selective membrane reactor are carried out for several values of total operating pressure and with various minimum allowable hydrogen concentrations (unseparated hydrogen) remaining on the reaction (retentate) side after the reaction and permeation process reach equilibrium.

First it is assumed that the retentate mixture, after permeation reaches equilibrium, contains 10% hydrogen (by mole fraction). FIG. 20 shows the resulting mixture composition for various reactor temperatures and an operating pressure of 1 atm (Case 1) with and without hydrogen removal. FIG. 21 shows the results for an operating pressure of 10 atm (Case 2). Table 3 shows the results for an operating pressure of 5 atm, assuming that the retentate mixture contains 20% hydrogen (Case 3) after the permeation reaches equilibrium. Notice that the methanol conversion increases and CO decreases when hydrogen is removed due to the equilibrium shift as hydrogen is separated from the mixture.

FIG. 20 shows equilibrium composition of product stream with and without hydrogen separation/removal (P=1 atm). FIG. 21 shows equilibrium composition of product stream with and without hydrogen separation/removal (P=10 atm). FIG. 22 shows equilibrium composition of product stream with and without hydrogen separation/removal (P=5 atm).

Figure 19:
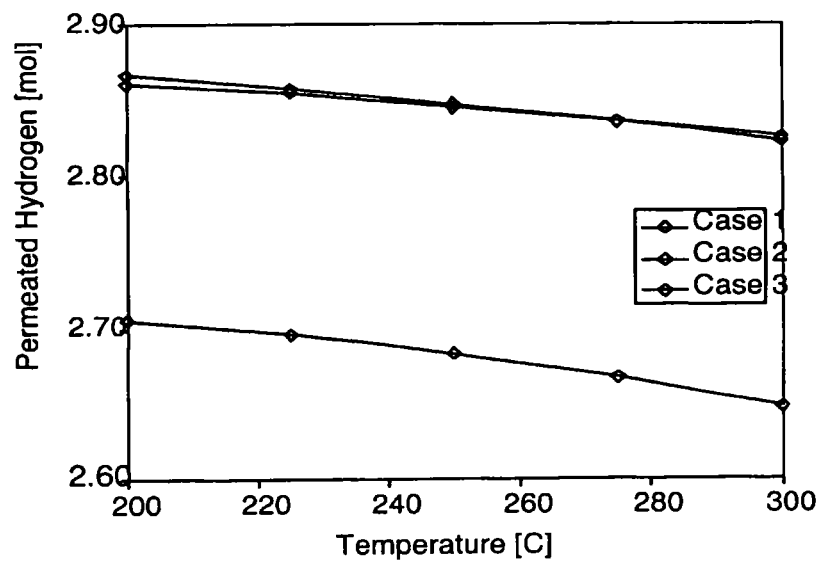
FIG. 19 is a graph that illustrates permeated hydrogen versus temperature for the exemplary flexible membrane reactor.

Of particular interest is the hydrogen recovered (separated) per mole of fuel and water. In the previous section it was shown that between 2.7 and 2.9 moles of hydrogen are produced (in the limit of chemical equilibrium). However, in those cases, the hydrogen was not separated/removed from the mixture and therefore not completely usable. FIG. 19 shows the production of pure, separated hydrogen for the three membrane reactor cases just mentioned. The first two cases are for reactors operating at 1 and 10 atmospheres of total pressure. The results are virtually indistinguishable because the hydrogen content of the remaining retentive mixture (after separation) is the same (10%) in both cases. In the third case this percentage is doubled (20%) resulting in a lower yield of pure, separated hydrogen (because more is left behind in the "exhaust" stream).

$CO_2$ Removal

The mixture that remains, after steam reforming and hydrogen separation processes are complete, is enriched in $CO_2$ (FIGS. 20-22). For illustrative purposes, we simulate a case where the $CO_2$ is separated from this mixture by liquefaction. The saturation pressure of pure $CO_2$ at 15° C. is 50 bars. By raising the pressure to 100 bars, and cooling the present mixture to 15° C., $CO_2$ will condense out of the gas phase leaving behind a mixture that is saturated with $CO_2$ vapor in equilibrium with the liquid phase (in this case, 50% $CO_2$ vapor). The balance of the gas phase mixture in this example is $H_2$ and CO. (Water vapor and methanol will be condensed to liquid under these conditions.)

Product Recycle

The remaining product mixture is recycled into the fuel stream of the reactor 10. The quantity of methanol is reduced so that the total carbon ($CH_3OH$, CO, and $CO_2$) in the fuel mixture remains at 1 mole. The water vapor is reduced so that the ratio of unreacted carbon ($CH_3OH$ and CO) to water vapor is 1:1. An example of the fuel stream composition (based on the results of calculations for Case 1 above) is shown in FIG. 23. Given this fuel mixture, the steam reforming and hydrogen membrane separation processes are simulated and the resulting mixture composition is calculated. FIG. 24 compares the results from an initially pure fuel mixture (Case A) and the fuel mixture that includes the recycled products (Case B shown in FIG. 23). The species concentrations of the resulting mixtures are virtually the same (within the error of the approximate calculations) for both cases. This indicates that the process of recycle, reaction, hydrogen separation, and $CO_2$ removal could be repeated over and over in a quasi-steady fashion. However, the recovered hydrogen (separated) per cycle (Case B) is reduced by 15-20% compared to the non-recycle case (Case A). Thus, the power density of the reactor is reduced due to recycling. While this is generally an undesirable effect, it is a small price to pay for achieving 100% fuel utilization and 100% $CO_2$ capture, especially in applications emphasizing energy conversion efficiency and environmental cleanliness. FIG. 23 shows fuel mixture with recycled products and FIG. 24 shows reaction product output without (A) and with (B) recycling.

Thus, in general, disclosed is reactor apparatus that includes a chamber having an input port and an output port, and a membrane coupled to the chamber that is selectively permeable to one or more chemical species. A catalyst is present in the chamber that catalyzes one or more chemical reactions. An actuator is used to introduce fuel into the chamber, control the volume of the chamber to cause catalytic chemical reactions within the chamber and cause separation of selected species via the membrane, and for exhausting reaction products from the chamber.

Furthermore, in broad terms, a method has been disclosed for processing fuel, that includes (1) introducing fuel into a controllable volume, (2) selectively controlling pressure, temperature and residence time of the fuel within the controllable volume, (3) chemically reacting the fuel within the controllable volume with one or more catalysts to produce one or more chemical species, and (4) exhausting residual products from the controllable volume.

Thus, exemplary reactors and methods that generate hydrogen from fuel, such as naturally-occurring or synthesized hydrocarbon fuel, have been disclosed. It is to be understood that the above-described embodiments are merely illustrative of some of the many specific embodiments that represent applications of the principles disclosed herein. Clearly, numerous and other arrangements can be readily devised by those skilled in the art without departing from the scope of the invention.

What is claimed is:

1. A method for processing fuel, comprising:
introducing fuel into a controllable volume;
selectively controlling pressure, temperature and residence time of the fuel within the controllable volume;
chemically reacting the fuel within the controllable volume aided by one or more catalysts to produce one or more chemical species; and
exhausting residual products from the controllable volume;
introducing the residual products into a second controllable volume;
selectively controlling pressure, temperature and residence time of the residual products within the second controllable volume;
chemically reacting the residual products within the second controllable volume aided by one or more catalysts to produce one or more additional chemical species; and
exhausting residual products derived from the additional chemical species from the second controllable volume;
wherein the catalysts catalyze fuel-steam-reforming, or fuel decomposition, or water-gas-shift, or fuel-steam-reforming and fuel decomposition and water-gas-shift reactions.

2. The method recited in claim 1 further comprising removing the one or more chemical species from the controllable volume via one or more membranes.

3. The method recited in claim 2 wherein the one or more membranes are selectively permeable to hydrogen ($H_2$), carbon dioxide, or hydrogen ($H_2$) and carbon dioxide.

4. The method recited in claim 1 further comprising controlling volume, pressure, and temperature via one or more actuators.

5. The method recited in claim 1 further comprising transferring heat to or from the controllable volume.

6. A method for processing fuel, comprising:
introducing fuel into a controllable volume;
selectively controlling pressure, temperature and residence time of the fuel within the controllable volume;
chemically reacting the fuel within the controllable volume aided by one or more catalysts to produce one or more chemical species; and
exhausting residual products from the controllable volume;
introducing the residual products into a second controllable volume;
selectively controlling pressure, temperature and residence time of the residual products within the second controllable volume;
chemically reacting the residual products within the second controllable volume aided by one or more catalysts to produce one or more additional chemical species; and
exhausting residual products derived from the additional chemical species from the second controllable volume;
wherein the catalysts catalyze fuel-steam-reforming, or fuel decomposition, or water-gas-shift, or fuel-steam-reforming and fuel decomposition and water-gas-shift reactions.

7. A method for processing fuel, comprising:
introducing fuel into a controllable volume;
selectively controlling pressure, temperature and residence time of the fuel within the controllable volume;
chemically reacting the fuel within the controllable volume aided by one or more catalysts to produce one or more chemical species; and
exhausting residual products from the controllable volume;
introducing the chemical species into a second controllable volume;
selectively controlling pressure, temperature and residence time of the chemical species within the second controllable volume;
chemically reacting the chemical species within the second controllable volume aided by one or more catalysts to produce one or more additional chemical species; and
exhausting residual products from the second controllable volume;
wherein the catalysts catalyze fuel-steam-reforming, or fuel decomposition, or water-gas-shift, or fuel-steam-reforming and fuel decomposition and water-gas-shift reactions.

* * * * *